United States Patent

Omoteda et al.

[11] Patent Number: 6,142,204
[45] Date of Patent: Nov. 7, 2000

[54] RUN-FLAT TIRE WITH TREAD REINFORCING LAYER

[75] Inventors: Masanori Omoteda; Tetsuhiko Yoshioka; Kenji Tagashira, all of Kobe, Japan

[73] Assignee: Sumitomo Rubber Industries, Ltd., Hyogo-Ken, Japan

[21] Appl. No.: 09/175,579

[22] Filed: Oct. 20, 1998

[30] Foreign Application Priority Data

Oct. 20, 1997 [JP] Japan .................................... 9-287103

[51] Int. Cl.[7] .................................. B60C 9/02; B60C 9/18; B60C 9/20; B60C 15/00; B60C 17/00
[52] U.S. Cl. .......................... 152/517; 152/516; 152/532; 152/533; 152/537; 152/549; 152/554; 152/564
[58] Field of Search ................................. 152/517, 549, 152/532, 533, 554, 516, 537, 564

[56] References Cited

FOREIGN PATENT DOCUMENTS

| | | |
|---|---|---|
| 0605177-A1 | 7/1994 | European Pat. Off. . |
| 0844110-A2 | 5/1998 | European Pat. Off. . |
| 2425334 | 7/1979 | France . |
| 2460218 | 1/1981 | France . |
| 2814937-A1 | 10/1978 | Germany . |

*Primary Examiner*—Adrienne C. Johnstone
*Attorney, Agent, or Firm*—Birch, Stewart, Kolasch & Birch, LLP

[57] ABSTRACT

A run-flat tire comprises a tread portion, a pair of bead portions, a pair of sidewall portions, a carcass comprising at least one carcass ply extending between the bead portions, a belt disposed radially outside the carcass in the tread portion, and a tread reinforcing layer disposed between carcass plies or alternatively between the carcass and belt, the tread reinforcing layer made of a high elastic modulus rubber compound having a complex elastic modulus E* of from 10 to 30 MPa, a thickness t of from 0.8 to 2.5 mm, and an axial width WA of 0.7 to 1.0 times the tread width TW of the tire.

5 Claims, 4 Drawing Sheets

RUN-FLAT TIRE WITH TREAD REINFORCING LAYER

BACKGROUND OF THE INVENTION

1. Field of the Invention

The present invention relates to a run-flat tire of wherein the tread portion is prevented from buckling to improve run-flat performances.

2. Description of Related Art

In general, as shown in FIG. 5, run-flat tires have a great mass of rubber (b) along the inside of the sidewall portions (a) to support tire loads during running under flat conditions. Thus, an increase in the tire weight is unavoidable. Further, due to the heat generated during running under flat conditions as well as normal conditions especially at a high speed, the internal temperature is liable to become very high, which sometimes decreases the durability of the sidewall portions contrary to expectation. Therefore, it is preferable to decrease the rubber volume in the sidewall portions as far as possible. However, if the rubber volume is decreased, the bending deformation of the sidewall portion (a) becomes relatively large as shown in FIG. 5. Accordingly, the heat generation increases and the durability decreases again. Thus, it is difficult to improve run-flat performances and durability at the same time.

In order to improve the run-flat performances and durability, the inventors studied and discovered that when the tire air pressure is zero the bending deformation (ya) of the sidewall portion (a) has a close relation with the buckling deformation (yt) of the tread portion (t). FIG. 4 shows such a relationship, wherein the bending deformation (ya) of the sidewall portion is indicated by a clearance (ha) of the inner surface of the tire measured along the radial direction at a distance (f) of 10 mm axially inwardly from the edge (e) of the ground contacting area as shown in FIG. 5. Thus, the smaller the clearance, the larger the bending deformation. The buckling deformation (yt) of the tread portion is indicated by the amount of lift-up (ht) measured at the tire equator from the road surface to the inner surface of the tire. Thus, the larger the lift-up, the larger the buckling deformation.

As shown in FIG. 4, the bending deformation of the sidewall portion was found to increase as the buckling deformation of the tread portion increases. Therefore, if the buckling deformation is decreased, the bending deformation can be decreased.

Further, it was also discovered that it is not effective for controlling the buckling deformation to dispose a reinforcing cord layer in the tread portion. The reinforcing cord layers such as belt, carcass and the like do not show their rigidity until the tire is inflated to a normal pressure under which a full tension is applied to the cords. Thus, it is difficult to increase the resistance to buckling deformation under flat conditions.

SUMMARY OF THE INVENTION

It is therefore an object of the present invention to provide a run-flat tire in which, by increasing the resistance to buckling deformation of the tread portion under flat conditions, deformation of the sidewall portions can be decreased without increasing the sidewall rubber volume. Therefore run-flat performances and durability can be improved at the same time.

According to the present invention, a run-flat tire comprises a carcass comprising at least one carcass ply extending between a pair of bead portions through a tread portion and a pair of sidewall portions, a belt disposed radially outside the carcass in the tread portion, a tread reinforcing layer disposed between carcass plies or alternatively between the carcass and belt, the tread reinforcing layer made of a high elastic modulus rubber compound having a complex elastic modulus of from 10 to 30 MPa, a thickness of from 0.8 to 2.5 mm, and an axial width of 0.7 to 1.0 times the tread width.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described in detail in conjunction with the accompanying drawings, in which.

DESCRIPTION OF THE PREFERRED EMBODIMENTS

Figure 1:
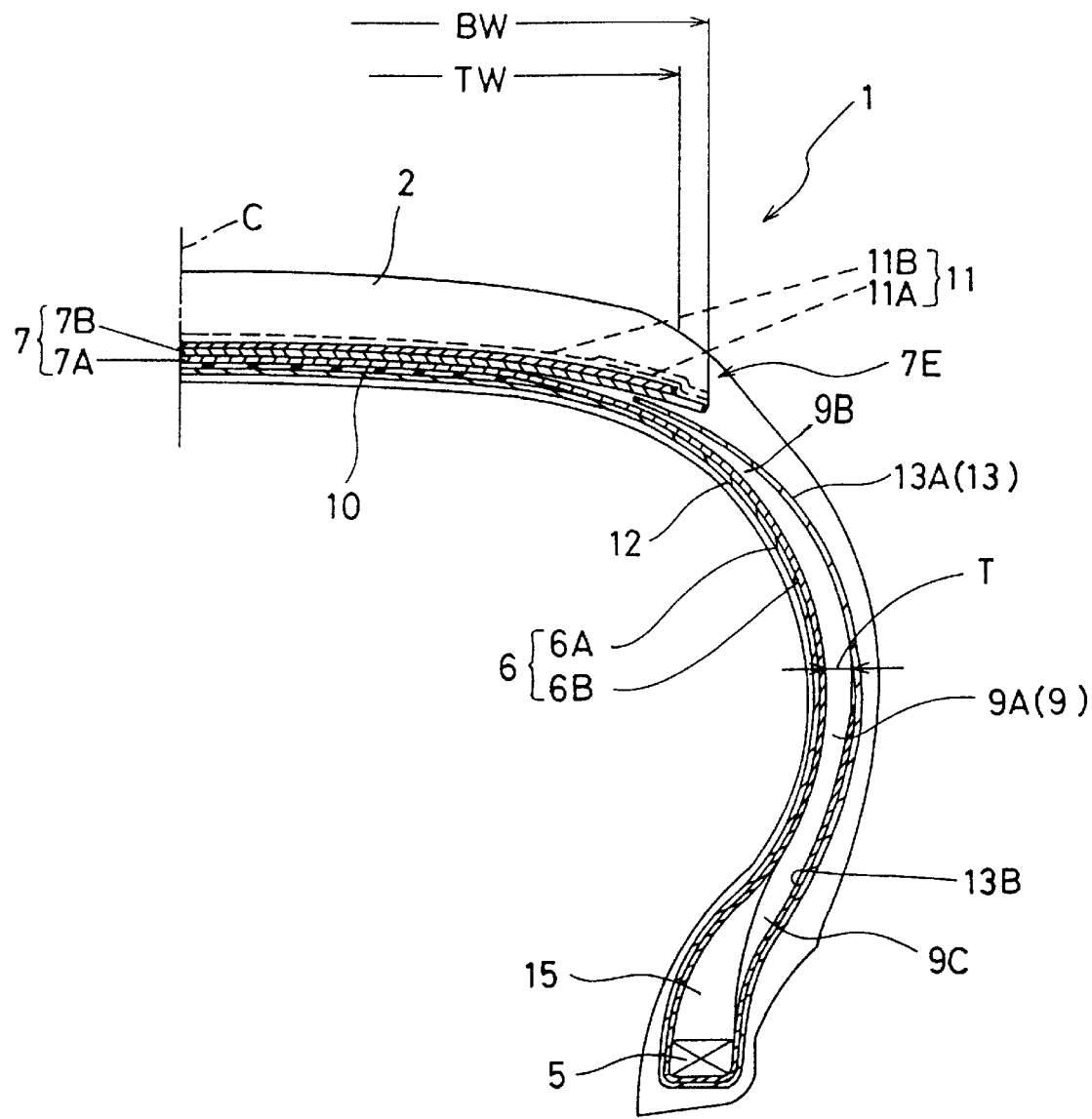
FIG. 1 is a cross sectional view of an embodiment of the present invention.

In the drawings, a run-flat tire 1 comprises a tread portion 2, a pair of sidewall portions 3, a pair of bead portions 4, a carcass 6 extending between the bead portions 4, a belt 7 disposed radially outside the carcass in the tread portion 2, a sidewall reinforcing rubber layer 9 disposed in each of the sidewall portions 3, and a tread reinforcing rubber layer 10 disposed in the tread portion 2.

In this embodiment, the tire 1 is a passenger radial tire wherein the tire size is 225/60R16.

The carcass 6 comprises at least one ply 6A, 6B of cords arranged radially at an angle of 75 to 90 degrees with respect to the tire equator C. For the carcass cords, organic fiber cords, e.g. nylon, rayon, polyester and the like and steel cords can be used.

In this embodiment, the carcass 6 is composed of two plies 6A and 6B, each extending between the bead portions 4 and being turned up around the bead core 5 in each of the bead portions from the axially inside to outside to form a pair of turnup portions 13 and a main portion 12 therebetween. The turnup portions of at least one of the carcass plies extend from the bead portions to the tread portion so that their edges are secured under the belt. As shown in FIG. 1, the turnup portions 13B of the outer carcass ply 6B terminate near the tire maximum width point, but the turnup portions 13A of the inner carcass ply 6A terminate in the tread portion 2 so as to overlap with the axially outer edge portions 7E of the belt 7. Thus, separation failures starting from the ends of the turnup portions 13A and 13B during run-flat can be effectively prevented, and the sidewall rigidity can be increased.

The above-mentioned belt 7 comprises at least one ply of high elastic modulus cords, such as steel, aromatic polyamid and the like, laid at an angle of 10 to 30 degrees with respect to the tire equator C. In this embodiment, the belt 7 is composed of two cross plies 7A and 7B of which cord inclinations differ from each other. The widest belt ply which is the radially inner belt ply 7A in this embodiment has a ply width BW of from 0.95 to 1.05 times the tread width TW so as to provide a hoop effect for the full width of the tread portion 2. Here, the tread width WT is the maximum ground contacting width between the axial outermost edges of the ground contacting region under such a condition that the tire is mounted on its standard rim and inflated to its standard pressure, and then loaded with a standard load. The standard rim is a rim officially approved for the tire by, for example JATMA (Japan), TRA (USA), ETRTO (Europe) and the like, and the standard inner pressure and the standard load are the maximum air pressure and the maximum tire load for the tire officially specified in Air-pressure/Maximum-load Table by the same associations.

Further, in the tread portion 2 in this embodiment, a band 11 is disposed radially outside the belt 7 to control the belt lifting during high-speed normal running. The band 11 is made of cords extending at substantially zero or a very small angle to the circumferential direction. The example shown is composed of a pair of axially spaced edge bands 11A covering the belt edges 7E and a full-width band 11B extending over the full width of the belt 7. Each of the bands 11A and 11B are formed by spirally winding nylon cords.

The above-mentioned bead portions 4 are each provided between the main portion 12 and turnup portion 13 of the carcass 6 with a bead apex 15. The bead apex 15 is made of a hard rubber compound having a JIS-A hardness of from 60 to 80 degrees.

Further, between the main portion 12 and turnup portion 13 in this embodiment, the above-mentioned sidewall portions 3 are each provided with the sidewall reinforcing layer 9. On the other hand, between the main portions of the two carcass plies in the sidewall portions, there is no rubber layer except for topping rubber. On the inside of the carcass, only a thin inner liner for air sealing is disposed.

The sidewall reinforcing layer 9 is made of a hard rubber compound having a JIS-A hardness of from 60 to 80 degrees, which is however, slightly softer than the bead apex rubber 15.

The bead apex 15 extends radially outwardly from the bead core 5 to a radial height between the maximum tire section width point and the height of the flange of the rim. The sidewall reinforcing layer 9 extends from a position near the radially outer end of the rim flange to a position below the belt edge in the tread portion along the axially outside of the bead apex 15. The radially outer edge part of the bead apex 15 and the radially inner edge part 9C of the layer 9 are tapered to splice to each other. The radially outer edge part 9B of the layer 9 is also tapered, and terminates near the end of the turnup portions 13A. Therefore, the radially outer edge part 9B overlaps with the belt edge 7E. The sidewall reinforcing layer 9 has a substantially constant thickness T in its central part 9A around the tire maximum section width point. In this embodiment, the thickness T is decreased to the range of from 3 to 5 mm to decrease the rubber volume.

As explained above, the sidewall reinforcing layer 9 and bead apex rubber 15 are united in one body and wrapped up in the carcass main portion and turnup portion to form a shell-like structure. Thus, the sidewall rigidity under flat conditions is effectively improved.

It is preferable to dispose the sidewall reinforcing layer between the carcass main portion and turnup portion. However, it may be disposed on the axially inside of the carcass 6.

Figure 2:
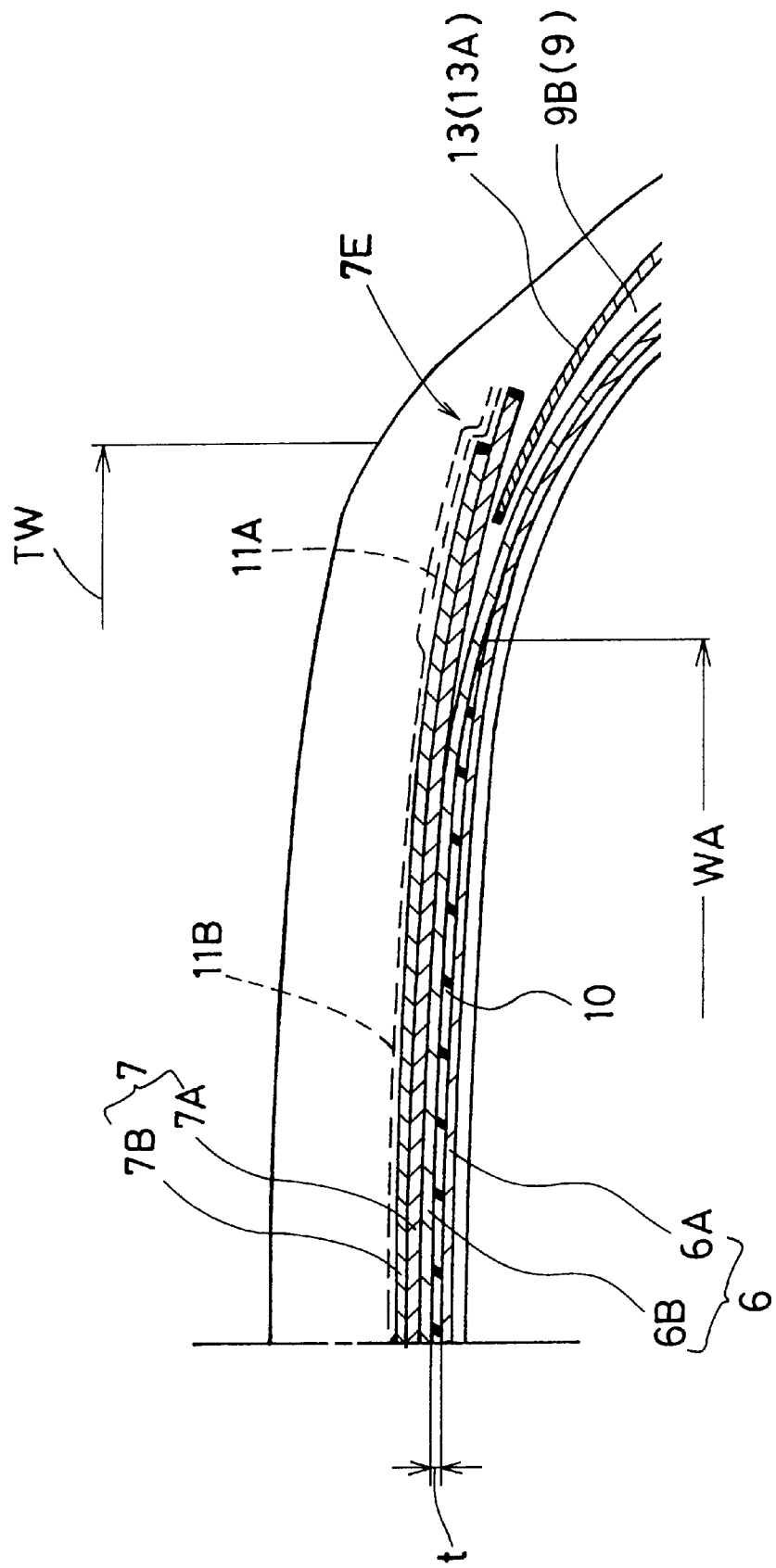
FIG. 2 is a cross sectional view of the tread portion thereof showing a tread reinforcing layer disposed between carcass plies.

The above-mentioned tread reinforcing layer 10 is disposed between cord plies in the tread portion 2. Preferably it is disposed between the radially adjacent carcass plies 6A and 6B as shown in FIG. 2. In this connection, the carcass 6 is preferably composed of at least two plies.

The tread reinforcing layer 10 is made of a high elastic modulus rubber compound having a complex elastic modulus $E^*$ of from 10 to 30 MPa. On the other hand, the topping rubbers for the carcass plies and belt plies have a complex elastic modulus $E^*$ in the range of not more than 7.8 MPa, usually 4 to 7 MPa. Accordingly, the tread reinforcing layer 10 is greatly increased in the complex elastic modulus $E^*$ from the adjacent topping rubber.

The complex elastic modulus $E^*$ was measured with a viscoelastic spectrometer of Iwamoto Seisakusyo make under the following conditions: temperature=70 degrees C, frequency=10 Hz, and dynamic distortion=2%.

The thickness t of the tread reinforcing layer 10 is in the range of from 0.8 to 2.5 mm, preferably 1.2 to 2.5 mm. The axial width WA thereof is in the range of from 0.7 to 1.0 times, preferably 0.7 to 0.95 times the tread width TW. It is preferable to provide a certain space between the axial edges of the tread reinforcing layer 10 and the radially outer edges of the sidewall reinforcing layers 9 so as to not overlap with each other. The hardness of the tread reinforcing layer 10 is set to be more than the above- mentioned topping rubber which usually has a JIS-A hardness of 60 to 75 degrees, but substantially the same as the sidewall reinforcing layer 9.

Therefore, the tread reinforcing layer 10 together with the adjacent cord plies greatly improve the bending rigidity of the tread portion to prevent the tread portion 2 from buckling.

If the complex elastic modulus E* is less than 10 MPa, the thickness t is less than 0.8 mm, and/or the width WA is less than 0.7 times the tread width TW, the buckling deformation controlling effect becomes decreased, and the durability can not be effectively improved. If the complex elastic modulus E* is more than 30 MPa, and/or the thickness t is more than 2.5 mm, the ride comfort and noise during normal running deteriorate.

If the width WA is more than 1.0 times the tread width TW and particularly when the tread reinforcing layer 10 overlaps the sidewall reinforcing layer 9, a rigidity balance is lost and the buckling deformation becomes increased.

Figure 3:
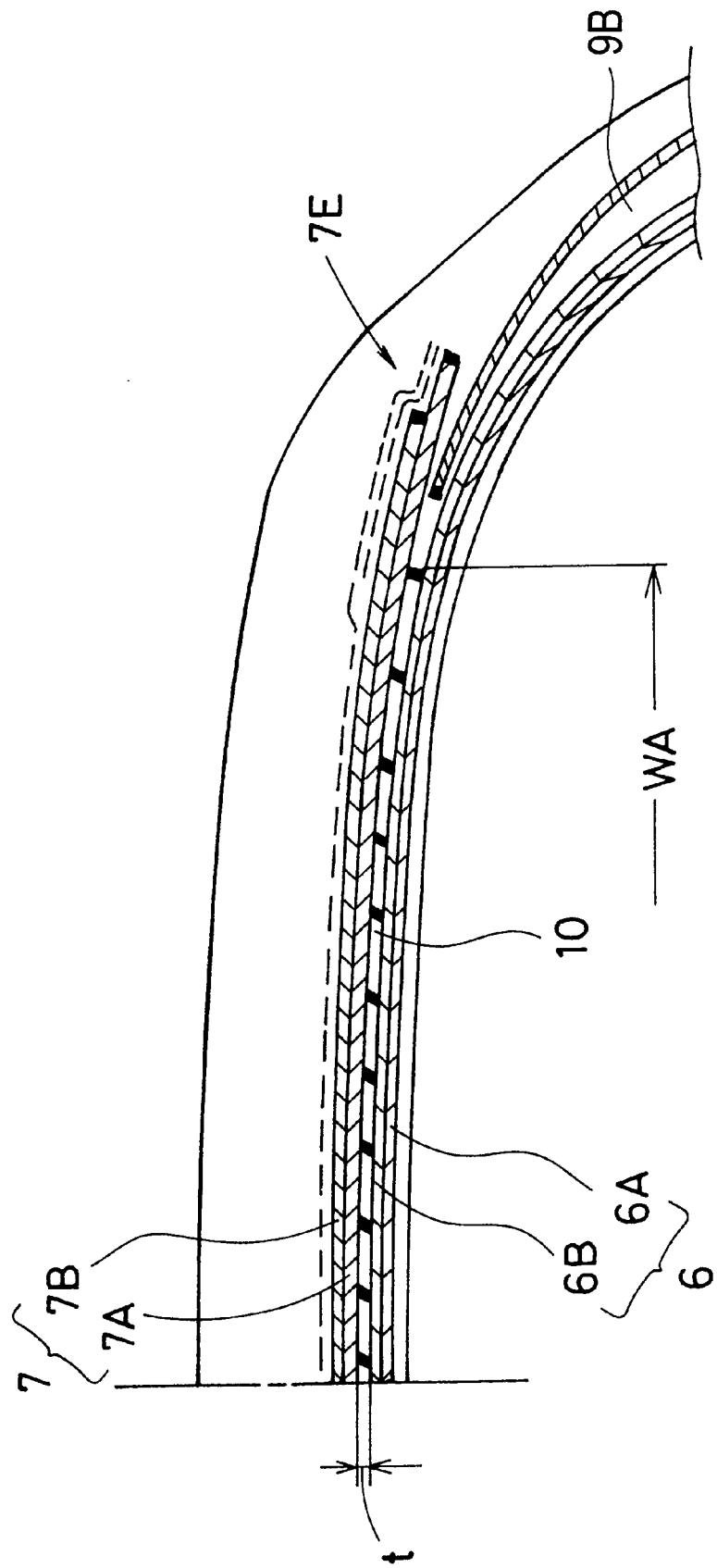
FIG. 3 is a cross sectional view of another example of the tread portion in which a tread reinforcing layer disposed between the carcass and belt.
Figure 4:
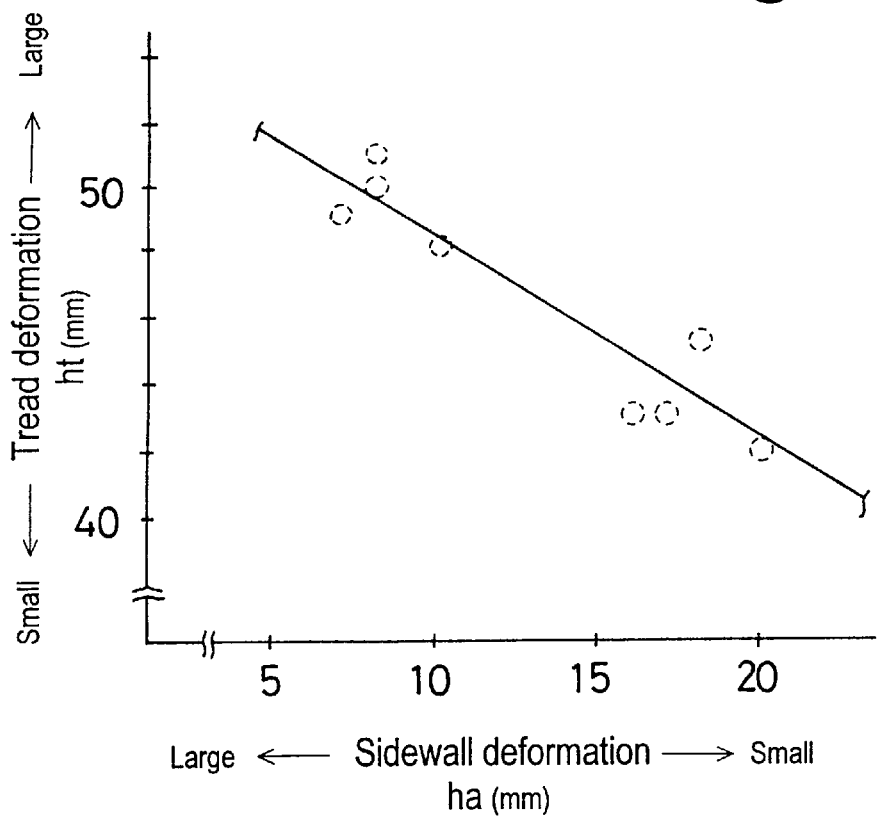
FIG. 4 is a diagram for explaining a relationship between a buckling deformation of tread portion and a bending deformation of sidewall portion.

The tread reinforcing layer 10 can be disposed between the carcass 6 and the belt 7 as shown in FIG. 3. It is however not preferable to dispose the layer between the belt plies 7A and 7B. If it is disposed between the belt plies, as the crossing cords of the adjacent plies are separated thereby, the rigidity of the belt as a whole decreases. Therefore, the rigidity increased by the tread reinforcing layer 10 is canceled, and the buckling deformation controlling effect can not be obtained. Further, a short- fiber reinforced rubber may be used as the tread reinforcing layer 10.

Test tires of size 225/60R16 having the structure shown in FIG. 1 and the specifications given in Table 1 were made and tested for run-flat performances as follows.

Figure 5:
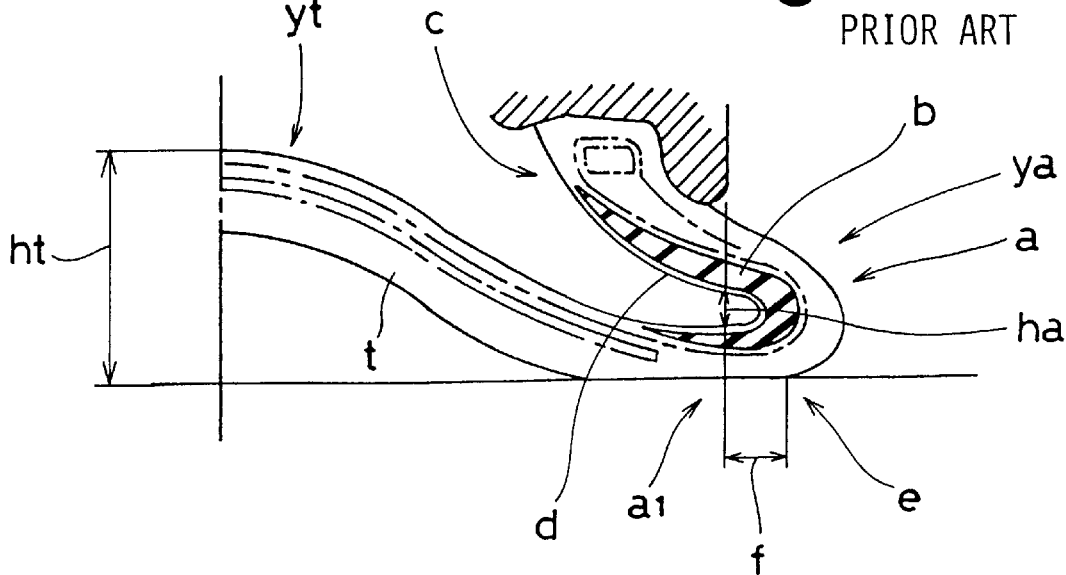
FIG. 5 is a diagram for explaining a ground contacting state of the prior art tire when the tire inner pressure is zero.

A test car, a FR passenger car provided on the right front wheel (rim size=16X71/2JJ) with a test tire (air pressure= zero) was run at a speed of 80 km/h until the tire was broken, and the running distance (km) was measured as the durability. The tire load was 585 kg. Also, deformations of the tire were measured. As the buckling deformation of the tread portion, the distance ht shown in FIG. 5 was measured. As the bending deformation of the sidewall portion, the clearance ha shown in FIG. 5 was measured.

It was confirmed from the test that Example tires 1 to 4 having a tread reinforcing layer disposed between the carcass plies or between the carcass and belt could be greatly improved in the durability in comparison with Reference tire 1 having no tread reinforcing layer and Reference tire 2 having a tread reinforcing layer between belt plies.

As described above, in the present invention, the buckling deformation of the tread portion is effectively decreased, and as a result the bending deformation of the sidewall portions is decreased. Therefore, the run-flat performances can be improved without increasing the tire weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Tire | Ex. 1 | Ex. 2 | Ex. 3 | Ex. 4 | Ref. 1 | Ref. 2 | Ref. 3 | Ref. 4 |
|---|---|---|---|---|---|---|---|---|
| Tread reinforcing layer | | | | | non | | | |
| Position (between) | carcass plies | carcass plies | carcass plies | carcass & belt | — | belt plies | carcass plies | carcass plies |
| Thickness t (mm) | 0.8 | 1.2 | 1.2 | 1.2 | — | 1.2 | 1.2 | 1.2 |
| Width ratio WA/TW | 0.7 | 0.7 | 0.7 | 0.7 | — | 0.7 | 0.7 | 0.5 |
| Complex elastic modulus (MPa) | 10 | 10 | 28 | 10 | — | 10 | 7 | 10 |
| Test result Deformation | | | | | | | | |
| Tread portion ht (mm) | 43 | 46 | 42 | 43 | 49 | 51 | 50 | 48 |
| Sidewall portion ha (mm) | 16 | 18 | 20 | 17 | 7 | 8 | 8 | 10 |
| Durability (km) | 60 | 84 | 100* | 52 | 7 | 5 | 13 | 38 |

*) This tire could run for a predetermined distance of 100 km without damage. Therefore, the test was stopped.

What is claimed is:

1. A run-flat tire comprising:

a tread portion;

a pair of bead portions;

a pair of sidewall portions;

a carcass comprising at least one carcass ply extending between the bead portions to form a carcass main portion;

a belt disposed radially outside the carcass in the tread portion;

a tread reinforcing layer disposed between carcass plies or alternatively between the carcass and belt; and the tread reinforcing layer being made of a high elastic modulus rubber compound having a complex elastic modulus E* measured at a temperature of 70° C., a frequency of 10 Hz, and a dynamic distortion of 2% of from 10 to 30 MPa, a thickness t of from 0.8 to 2.5 mm, and an axial width WA of 0.7 to 1.0 times the tread width TW of the tire.

2. The run-flat tire according to claim 1, wherein the sidewall portions are each provided with a sidewall reinforcing layer made of a rubber compound adjoining a carcass main portion and comprising a tapered radially outer part and a tapered radially inner part.

3. The run-flat tire according to claim 2, wherein said sidewall reinforcing layer has a radially outer end spaced apart from the axially outer ends of the tread reinforcing layer.

4. The run-flat tire according to claim 1, further comprising:

said carcass comprises two carcass plies each extending between the bead portions and turned up around a bead core in each of the bead portions from the axially inside to outside of the tire so that each of the two carcass plies comprises a pair of turnup portions and a main portion therebetween;

said tread reinforcing layer is disposed between said two carcass plies;

the turnup portions of at least one of said carcass plies extend from the bead portions to the tread portion so that the edges thereof are secured under the belt;

said sidewall portions are each provided with a sidewall reinforcing layer disposed between one of said turnup portions extending to the tread portion and the axially inwardly adjacent carcass ply main portion;

said sidewall reinforcing layer is made of a hard rubber compound having a JIS-A hardness of from 60 to 80 degrees; and said sidewall reinforcing layer tapers radially inwardly and outwardly and the maximum thickness thereof is in the range of from 3 to 5 mm.

5. The run-flat tire according to claim 4, further comprising:

on the axially inside of the carcass there is provided only a thin inner liner for air sealing; and said sidewall portions are provided between the main portions of said two carcass plies with no rubber layer other than topping rubber for the carcass plies.

* * * * *